United States Patent Office 3,354,097
Patented Nov. 21, 1967

3,354,097
UNSUPPORTED FILM OF POLY
(ISOBUTYLENE OXIDE)
Edwin J. Vandenberg, Wilmington, Del., assignor to
Hercules Incorporated, a corporation of Delaware
No Drawing. Filed June 29, 1961, Ser. No. 120,495
1 Claim. (Cl. 260—2)

This application is a continuation-in-part of my U.S. application Ser. No. 812,079 filed May 11, 1959, now Patent No. 3,135,705, which is in turn a continuation-in-part of my U.S. application Ser. No. 738,626 filed May 29, 1958, now abandoned.

This invention relates to a new crystalline, linear poly (epoxide), and more particularly to a new crystalline, linear poly(isobutylene oxide) which has a high melting point and is highly insoluble in a wide variety of solvents.

It is known that isobutylene oxide may be polymerized to produce a waxlike polymer which has a melting point of 70–150° C., is extremely unstable when heated and which is soluble in most organic solvents. Hence, this polymer is of very limited utility.

Now in accordance with this invention it has been discovered that when isobutylene oxide is polymerized with alkylaluminum catalysts at very low temperatures, a poly (isobutylene oxide) is produced that has a high melting point and which is highly insoluble in organic solvents. This new crystalline poly(isobutylene oxide) has a melting point of from about 167° C. to about 177° C., a reduced specific viscosity of at least 0.10, and preferably 0.40 and above, and is a hard, high modulus solid as contrasted with the prior art polymer which is a soft wax. It is further characterized by its insolubility in a wide variety of solvents, many of which dissolve the prior art polymer. Thus, it is insoluble in chloroform at room temperature, but is soluble at about 100° C., recrystallizing out of solution on recooling to room temperature. It is insoluble in acetone and benzene, insoluble in both cold and hot (80° C.) methanol and insoluble in both cold and hot (70° C.) tetrahydrofuran.

This new poly(isobutylene oxide) is a linear, head-to-tail polyether, polymerization taking place between the epoxide groups, and is believed to be made up of the following recurring units:

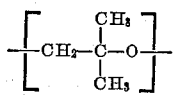

The polymer has some reactive chain ends, i.e. hydroxyl groups and/or ethylene double bonds and, accordingly, can be further modified by means of esterification, etherification, etc., to further improve its properties for many applications.

This high melting poly(isobutylene oxide) has excellent heat stability at or near the melting point and recrystallizes readily from the melt on cooling. This excellent heat stability, coupled with its other good physical properties, particularly at low temperature, makes this polymer of value in many applications. Thus, a polymer of low molecular weight and an RSV of about 0.1 to about 0.4 is useful for protective coatings of outstanding solvent resistance and good stability. A polymer of high molecular weight, i.e. with an RSV of at least about 0.4, and preferably of 0.8 and above, is very useful for the manufacture of films and fibers, unoriented and oriented, molded articles, and coatings. In certain applications it may be desirable to incorporate antioxidants and/or acid acceptors. Other additives may also be incorporated as, for example, pigments, plasticizers, etc.

The new high-melting poly(isobuytlene oxide) of this invention may be prepared by contacting isobutylene oxide with an alkylaluminum catalyst at a temperature of from about −200° C. to about −30° C., and preferably at a temperature of from about −150° C. to about −50° C. The alkylaluminum catalyst that is used is preferably a trialkylauminum or a dialkylaluminum hydride, and more preferably this alkylaluminum compound is one that has been reacted with water in the molar ratio of from about 1:0.1 to about 1.5:1, respectively, and preferably from about 1 to about 0.2 to about 1:1, respectively. The alkylaluminum compound used as a catalyst may also be reacted with water and a chelating agent, such as acetylacetone. While the polymerization reaction may be carried out by a bulk process, i.e. in the absence of a diluent, it is generally carried out in an inert diluent. Preferably the inert diluent is an aliphatic hydrocarbon such as methane, ethane, propane, neopentane, n-pentane, neohexane, n-heptane, etc., or a mixture of any of these aliphatic hydrocarbons. Another diluent which is particularly useful is carbon disulfide. A preferred embodiment is to carry out the polymerization at the boiling point of a low boiling diluent, such as ethane, to remove the heat of polymerization and maintain a low temperature. To obtain a polymer of high molecular weight the monomer and diluent should be of high purity. In particular, the polymerization should be carried out in the absence of such impurities as aldehydes, ketones, alcohols, water, carbon dioxide, oxygen, acids, etc.

The following examples will illustrate the preparation of a new high molecular weight poly(isobutylene oxide) of this invention and its properties. The molecular weight of the polymer is indicated by the reduced specific viscosity (RSV). By the term "reduced specific viscosity" is meant the ηsp./C. determined on a 0.1% solution of the polymer in α-chloronaphthalene at 135° C., prepared if necessary by dissolving at higher temperatures as, for example, at 170° C. The melting points given are the temperature at which birefringence due to crystallinity disappears. All parts and percentages are by weight unless otherwise indicated.

*Examples 1–4*

The isobutylene oxide used in these examples was a commercial product which was purified by passing through a molecular sieve column. In each of these examples a polymerization vessel filled with nitrogen was charged with the diluent, n-heptane, and 10 parts of isobutylene oxide. After equilibrating the vessel and contents at −78° C., a solution of the catalyst in n-heptane was injected. The catalyst used in Example 1 was triisobutylaluminum which had been reacted in n-heptane with 0.5 mole of water per mole of aluminum. In Example 2 the catalyst was triisobutylaluminum. In Example 3 the catalyst was triisobutylaluminum which had been reacted with isoprene and retained about one isobutyl group per aluminum. In Example 4 the catalyst was the organoaluminum compound produced by reacting aluminum with hydrogen and isoprene and believed to have the composition $Al(C_5H_9)_3$. In Examples 1 and 2 the catalyst was added in two portions one hour apart. Although most of the polymerization occurred soon after the catalyst was added, the reaction mixture was kept at −78° C. for 18 hours (21 hours in Example 1). The polymerization was then stopped by adding 4 parts of anhydrous ethanol. The mixture was diluted with ether, washed twice with 10% aqueous sodium hydroxide, washed neutral with water, and the ether-insoluble polymer was collected. It was washed twice with ether and once with ether containing 0.4% of 4,4′-thiobis(6-tert-butyl-m-cresol), and finally it was dried for 16 hours at 80° C. under vacuum.

In Table I are set forth the amount of n-heptane charged, the millimoles of catalyst used and the amount of n-heptane in the catalyst solution, the conversion to ether-insoluble polymer, the RSV and the melting point of the polymer. All of these polymers were shown to be crystalline by X-ray diffraction and were insoluble in cold or hot (i.e. the boiling point) methanol, acetone, benzene, tetrahydrofuran, and chloroform.

In Example 1 there was also produced 5% of an ether-soluble polymer which was a soft wax, and in Example 4 there was produced 10% of the waxy ether-soluble polymer.

After standing for 0.5 hour at this tempertaure, n-pentane was gradually added to the liquid nitrogen cooling bath, and the reaction mixture allowed to gradually warm up. Polymerization occurred at about the freezing point of the n-pentane diluent (−131° C.). In Table II are set forth the diluent used and amount thereof, the catalyst and millimoles thereof used, and amount of n-heptane diluent in the catalyst solution, together with the percent conversion, RSV and melting point of the ether-insoluble polymer so produced. The triisohexylaluminum used in Examples 7 and 8 was tri-2-methyl-pentylaluminum. In Example 9 the catalyst was added in two portions one hour apart.

TABLE II

| Example | Diluent | Parts | Catalyst | Milli-moles | Parts n-Heptane | Ether-Insoluble Polymer Isolated | | |
|---|---|---|---|---|---|---|---|---|
| | | | | | | Percent Conv. | RSV | M.P., ° C. |
| 5 | n-Heptane | 28 | $(i-C_4H_9)_3Al$ | 4 | 2.4 | 54 | 0.18 | 175 |
| 6 | n-Pentane | 31 | $(i-C_4H_9)_3Al$ | 2 | 1.0 | 36 | 0.41 | 174 |
| 7 | do | 31 | $(i-C_6H_{13})_3Al$ | 2 | 1.2 | 47 | 0.32 | 177 |
| 8 | do | 31 | $(i-C_6H_{13})_3Al$ | 1.9 | 1.2 | 22 | 0.16 | 173 |
| 9 | n-Heptane | 31 | $(C_8H_{17})_3Al$ | 8 | 0 | 75 | 0.17 | 171 |
| 10 | do | 29 | $(i-C_4H_9)_2AlH$ | 4 | 1.6 | 59 | 0.15 | 173 |
| 11 | n-Pentane | 31 | $(i-C_4H_9)_3Al$ | 2 | 1.0 | 34 | 0.22 | 175 |

There was no ether-soluble polymer produced in any of these examples. The ether-insoluble polymers in each case were shown to be crystalline by X-ray and had the same solubilities as the products obtained in Examples 1–4.

A film was prepared from the polymer of Example 6 by spreading from the melt and cooling rapidly. It did not break on being flexed several times and could be elongated by cold drawing. Another film was prepared by compression molding this sample between aluminum sheets for two minutes at 500 p.s.i. and at 170° C., removing from the press, quenching immediately into a Dry Ice-acetone bath. This gave a hard, high modulus, clear and highly birefringent film (about 1 mil thick). A sample of this film was placed in the Fade-Ometer for 48 hours, and it remained clear and undiscolored. Fibers

TABLE I

| Example | Parts Heptane | Catalyst | Milli-moles | Parts Heptane | Isollated Ether-Insoluble Polymer | | |
|---|---|---|---|---|---|---|---|
| | | | | | Percent Conv. | RSV | M.P., ° C. |
| 1 | 29.3 | $(i-C_4H_9)_3Al \cdot 0.5H_2O$ | 8 | 9.6 | 58 | 0.10 | 168 |
| 2 | 24.9 | $(i-C_4H_9)_3Al$ | 8 | 4.8 | 48 | 0.10 | 173 |
| 3 | 24.5 | $(i-C_4H_9)_3Al$—isoprene reaction product | 12 | 8.0 | 37 | 0.14 | 169 |
| 4 | 24.5 | Al—$H_2$-isoprene reaction product | 12 | 7.3 | 56 | 0.14 | 170 |

*Examples 5–11*

The procedure described in Examples 1–4 was used in these examples, except that the isobutylene oxide used in Examples 5–10 was dried with ether by azeotropic distillation and then further purified by fractionation in a 75- or 100-plate column at 100:1 reflux ratio. Gas chromatography showed that it was about 99.7% pure, containing only 0.3% ether. It analyzed 0.04% water. That used in Example 11 was then further purified in a gas chromatography column and contained <0.01% ether. The polymerizations in Examples 5–7, and 9–11 were carried out at −78° C. for 19 hours except for Example 11 which was run only two hours. In Example 8 the ingredients were mixed at liquid nitrogen temperature.

were prepared from the polymer of Example 6 by drawing from the melt at 200–210° C.

A poly(isobutylene oxide) having an RSV of 0.14 was fabricated into a solid piece by melting and cooling under nitrogen to give a very hard, high modulus, solid which had a density of 1.022 g./cc. at 25° C. Dilatometric studies showed it to have a melting range of 167–173° C. It had excellent heat stability at or near the melting point, and a second-order transition temperature of 45–50° C. with no other transition down to −65° C.

What I claim and desire to protect by Letters Patent is:

An unsupported film of the polymer, a crystalline poly(isobutylene oxide), having a melting point of from 167° to 177° C. and having a reduced specific viscosity of at least about 0.4 as measured on a 0.1 percent solution in α-chloronaphthalene at 135° C., said poly(isobutylene oxide) being insoluble in acetone, benzene, chloroform, methanol and tetrahydrofuran at both room temperature and at their boiling points.

References Cited

UNITED STATES PATENTS

| | | | |
|---|---|---|---|
| 2,706,181 | 4/1955 | Pruitt et al. | 260—2 |
| 2,870,100 | 2/1956 | Stewart et al. | 260—2 |
| 2,844,545 | 7/1958 | Borkovec | 260—2 |
| 3,016,394 | 1/1962 | Scott | 260—2 |

FOREIGN PATENTS 582,266  11/1946  Great Britain.

OTHER REFERENCES

Ishida Chemical Society of Japan Bulletin vol. 33, No. 7, pp. 924–930, July 1960.

WILLIAM H. SHORT, *Primary Examiner.*

H. H. BERSTEIN, LOUISE P. QUAST, *Examiners.*

P. H. HELLER, S. N. RICE, T. PERTILLA,
                            *Assistant Examiner.*